June 4, 1963  S. L. CLARK ET AL  3,092,664
ALKYLATED DECABORANE-ACETYLENIC HYDROCARBON REACTION
PRODUCTS AND METHOD FOR THEIR PREPARATION
Filed Dec. 11, 1958  2 Sheets-Sheet 1

○ BORON

◎ CARBON

○ HYDROGEN ON CARBON
(Hydrogen atoms on boron
omitted for clarity)

INVENTORS
SHELDON L. CLARK
BY DONALD J. MANGOLD

Adams Forward and McLean
ATTORNEYS

June 4, 1963  S. L. CLARK ET AL  3,092,664
ALKYLATED DECABORANE-ACETYLENIC HYDROCARBON REACTION
PRODUCTS AND METHOD FOR THEIR PREPARATION
Filed Dec. 11, 1958  2 Sheets-Sheet 2

○ BORON

◉ CARBON

○ HYDROGEN ON CARBON
(Hydrogen atoms on boron
omitted for clarity)

INVENTORS
SHELDON L. CLARK
BY DONALD J. MANGOLD

Adams Forward and McLean

ATTORNEYS 3,092,664
ALKYLATED DECABORANE-ACETYLENIC HYDROCARBON REACTION PRODUCTS AND METHOD FOR THEIR PREPARATION
Sheldon L. Clark, Eggertsville, and Donald J. Mangold, Youngstown, N.Y., assignors to Olin Mathieson Chemical Corporation, a corporation of Virginia
Filed Dec. 11, 1958, Ser. No. 779,733
20 Claims. (Cl. 260—606.5)

This invention relates to organoboron compounds and to a method for their preparation.

Copending application Serial No. 741,976, filed June 13, 1958, now abandoned, of John W. Ager, Jr., Theodore L. Heying and Donald J. Mangold describes a mehtod for the preparation of boranes of the class $RR'B_{10}H_8(CR''CR''')$, wherein R and R' are each hydrogen or an alkyl radical containing from 1 to 5 carbon atoms, R'' and R''' are each hydrogen, an alkyl radical or a monoalkenyl hydrocarbon radical, with the proviso that the total number of carbon atoms in R'' and R''' taken together does not exceed eight. These boranes are prepared by the reaction of decaborane or an alkylated decaborane having 1 to 2 alkyl groups containing 1 to 5 carbon atoms in each alkyl group with an acetylenic hydrocarbon containing from two to ten carbon atoms in the presence of any of a wide variety of ethers, nitriles, or amines. The ratio of reactants generally is within the range from 0.05 to 20 moles of decaborane or alkyldecaborane per mole of acetylenic compound and the ratio of ether, nitrile or amine to decaborane or alkyldecaborane generally is within the range from 0.001 to 100:1. The reaction temperature generally is from $+25°$ to $+180°$ C. and the reaction pressure can vary from 0.2 to 20 atmospheres.

Figure 1:
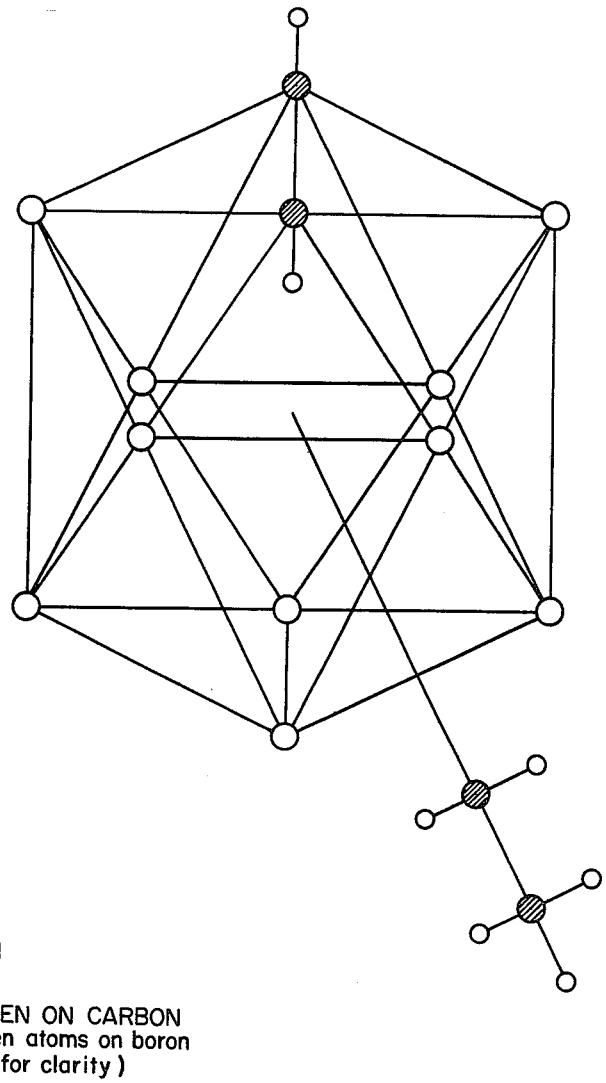

A specific compound of the class described in Serial No. 741,976 and produced by the reaction of ethyldecaborane and acetylene has the empirical formula $C_2H_5B_{10}H_9(CHCH)$ and the structural formula shown in FIGURE 1 of the accompanying drawings.

Figure 2:
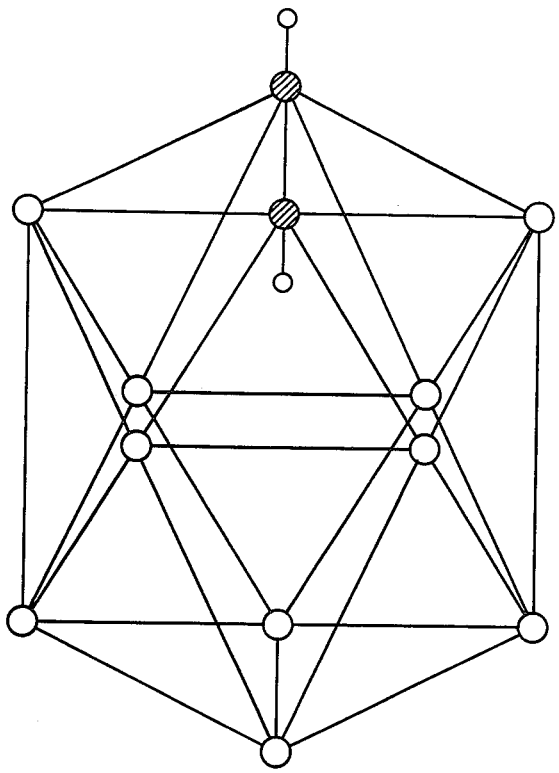

A specific compound of the class described in Serial No. 741,976 and produced by the reaction of decaborane and acetylene has the empirical formula $B_{10}H_{10}(CHCH)$ and the structural formula shown in FIGURE 2 of the accompanying drawings.

In accordance with the present invention, it has been discovered that compounds having a structural formula of the class of FIGURE 2 can be alkylated to produce compounds having a structural formula of the class of FIGURE 1 and that compounds having a structural formula of the class of FIGURE 1 can be further alkylated by reaction with an alkyl halide in the presence of an alkylation catalyst. Thus according to the method of the present invention, a borane of the class $$RR'B_{10}H_8(CR''CR''')$$

wherein R and R' are each hydrogen or an alkyl radical containing from 1 to 5 carbon atoms, R'' and R''' are each hydrogen, an alkyl radical or a monoalkenyl hydrocarbon radical, the total number of carbon atoms in R'' is R''' taken together not exceeding eight, is reacted with the formation of hydrogen halide with an alkyl halide wherein the alkyl radical contains from 1 to 5 carbon atoms in the presence of an alkylation catalyst selected from the group consisting of aluminum bromide, aluminum chloride and ferric bromide.

Suitable alkyl halides include, for example, methyl bromide, methyl chloride, methyl iodide, methyl fluoride, ethyl bromide, ethyl chloride, ethyl iodide, ethyl fluoride, isopropyl bromide, isopropyl chloride, isopropyl iodide, isopropyl fluoride, n-propyl bromide, n-propyl chloride, n-butyl bromide, n-butyl chloride, n-amyl bromide and n-amyl chloride.

The ratio of reactants can be varied widely, generally being in the range of 0.1 to 30 moles of alkyl halide per mole of borane and preferably in the range of 1.0 to 15 moles of alkyl halide per mole of borane. The ratio of alkylation catalyst to borane also can be varied widely, generally being in the range of 0.01 to 2 moles of alkylation catalyst per mole of borane and preferably being in the range of 0.1 to 0.2 mole of alkylation catalyst per mole of borane. The reaction temperatures can vary from $-10°$ to $180°$ C. and preferably between $0°$ and $50°$ C., although reactions conducted at atmospheric pressure are frequently conducted at the reflux temperature of the solvent or alkyl halide employed. The pressure can vary from subatmospheric to several atmospheres, i.e., from 0.2 to 20 atmospheres, although atmospheric pressure reactions are convenient. The degree of completeness of the reaction may be determined by the rate and quantity of hydrogen halide evolved, or by analysis of the reaction mixture. The reaction generally requires about 2 to 30 hours depending upon the ratio of reactants, the particular reactants and solvents employed and the temperature and pressure of the reaction.

The reaction can or need not be conducted in a solvent common for the reactants but inert with respect to the reactants. Such solvents include aliphatic hydrocarbon solvents such as n-pentane, hexane, and heptane, aromatic hydrocarbon solvents such as benzene, toluene and xylene, and cycloaliphatic solvents such as cyclohexane and methylcyclohexane. The amount of solvent can vary widely, but generally ranges up to about 20 times the weight of the reactants.

The process of the invention is illustrated in detail by the following examples which are to be considered not limitative.

*Example I*

In a three-necked flask fitted with an addition funnel, a Dry-Ice-cooled cold finger, and a nitrogen inlet, were placed 5.30 g. (0.037 mole) of $B_{10}H_{10}CHCH$ and 0.53 g. (0.004 mole) of aluminum chloride. 15 ml. (0.274 mole) of cold methyl bromide were added through the addition funnel. Nitrogen was passed slowly over the constantly stirred reaction mixture and the exit gases were passed through a water scrubber and titrated with 1 N sodium hydroxide solution. The reaction proceeded at about 3.5° C. for eight hours after which time the methyl bromide was allowed to evaporate overnight. An additional 15 ml. (0.274 mole) of methyl bromide then were added and the reaction was allowed to proceed for an additional three hours. The water scrubber required a total of 27.5 ml. of 1 N sodium hydroxide solution, corresponding to the formation of 0.0275 mole of hydrogen bromide. After the reaction, the methyl bromide was allowed to evaporate and benzene was added to the remaining liquid. The mixture was stirred and then filtered. The resulting solution was evaporated at room temperature at an absolute pressure of about 5 mm. of mercury. Mass spectrometric analysis of the distillate showed it to be benzene. The residue was then distilled under vacuum to give a fraction collectedat about 43° C. at an absolute pressure of about 20 mm. of mercury, a fraction collected at room temperature at an absolute pressure of less than 1 mm. of mercury, a fraction collected in the cold trap at a temperature of $-196°$ C. and a solid residue. All the liquid fractions were identified by mass spectrometric analysis to be benzene. The solid residue was shown by mass spectrometric analysis to consist of the following:

$B_{10}H_{10}CHCH$, $CH_3B_{10}H_9CHCH$, $(CH_3)_2B_{10}H_8CHCH$ $(CH_3)_3B_{10}H_7CHCH$, $(CH_3)_4B_{10}H_6CHCH$ $(CH_3)_5B_{10}H_5CHCH$, $(CH_3)_6B_{10}H_4CHCH$ with the respective peak heights at the parent peak position (at. wt. B=11) given by the following ratio 2·5:2·6:4·0:5·3:34·0:3·8:0·1. This solid residue was sublimed at 120° C. at an absolute pressure of less than 1 mm. of mercury for 24 hours to give 1.10 g. of sublimed material and 0.13 g. of unsublimed material. The sublimed material was shown by mass spectrometric analysis to consist of the following:

$B_{10}H_{10}CHCH$, $(CH_3)B_{10}H_9CHCH$, $(CH_3)_2B_{10}H_8CHCH$ $(CH_3)_3B_{10}H_7CHCH$, $(CH_3)_4B_{10}H_6CHCH$ $(CH_3)_5B_{10}H_5CHCH$, $(CH_3)_6B_{10}H_4CHCH$ $(CH_3)_7B_{10}H_3CHCH$ with the respective beak heights at the parent peak position (at. wt. B=11) given by the following ratio 1·2:0·9:0·7:2·0:16·5:2·0:0·4:0·1. Chemical analysis of the sublimed material showed it to contain 53.7 percent boron. A mass spectrometric analysis of the unsublimed material indicated the presence of materials similar to that of the sublimed material.

*Example II*

A mixture of 1.42 g. (0.0099 mole) of $B_{10}H_{10}CHCH$, 0.14 g. (0.0015 mole) of aluminum chloride, 0.9 ml. (1.26 g., 0.012 mole) of ethyl bromide and 25 ml. (0.226 mole) of cyclohexane was refluxed for 6 hours in a 50 ml. round bottom flask equipped with a reflux condenser. Mass spectrometric analysis of a sample of the solution showed the presence of $B_{10}H_{10}CHCH$, $(C_2H_5)B_{10}H_9CHCH$ $(C_2H_5)_2B_{10}H_8CHCH$, and $(C_2H_5)_3B_{10}H_7CHCH$ Refluxing was continued for another 16 hours. Mass spectrometric analysis of the solution showed $B_{10}H_{10}CHCH$, $(C_2H_5)B_{10}H_9CHCH$ $(C_2H_5)_2B_{10}H_8CHCH$, $(C_2H_5)_3B_{10}H_7CHCH$ $(C_2H_5)_4B_{10}H_6CHCH$, $(C_2H_5)_5B_{10}H_5CHCH$ and $(C_2H_5)_6B_{10}H_4CHCH$ The solvent was removed by distillation and these materials were found by mass spectormetric analysis to be in the residue.

The solid products of this invention, when incorporated with suitable oxidizers such as ammonium perchlorate, potassium perchlorate, sodium perchlorate, ammonium nitrate etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result in the use of the higher specific impulse material. The products of this invention, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 69 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid products of this invention may be used as fuels according to the method described in application Serial No. 497,407, filed March 28, 1955, now U.S. Patent No. 2,999,117 by Elmar R. Altwicker, Alfred B. Garrett, Samuel W. Harris and Earl A. Weilmuenster. A major advantage of these new liquid products is the high stability they exhibit at elevated temperatures. One of the shortcomings of many high energy fuels is their limited stability at the high temperatures sometimes encountered in their use. The liquid products of this invention, however, exhibit relatively little decomposition even after having been maintained at 500° or 750° F. for periods of twenty-four hours and more, thus rendering them well suited for more extreme conditions of storage and use. The liquid products of this invention are also of high density.

The liquid compositions of our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The proucts of our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the

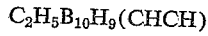

$$C_2H_5B_{10}H_9(CHCH)$$

for example, this load fuel to air ratio by weight is approximately 0.081. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuels presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of our invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrcarbon fuel present in the mixture, and consistent with the air dilution required to maintain the gas temperatures of these mixtures within accepted turbine operating temperatures.

Because of their high chemical reactivity and heating values, the liquid products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient presure and efficient and stable combustion under such conditions is normally difficult with simple hydrocarbons. Extinction of the combustion process in the afterburner may also occur under these conditions of extreme altitude operation with conventional aircraft fuels.

The burning characteristics of the liquid products of our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-after-burning performance of a gas turbine-afterburner combination is also possible because the high chemical reactivity of the products of our invention eliminates the need of flameholding devices within the combustion zone of the afterburner. When employed in an afterburner, the fuels of our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of our invention will improve the combustion process of the ramjet in much the same manner as that described for the afterburner because of their improved chemical reactivity over that of simple hydrocarbon fuels. When employed in a ramjet, the liquid fuels of our invention will be simply substituted for hydrocarbon fuels and used in the established manner.

It is claimed:

1. A method for the production of an organoboron compound useful as a fuel which comprises reacting with the formation of hydrogen halide a borane of the class $RR'B_{10}H_8(CR''CR''')$, wherein R and R' are each selected from the group consisting of hydrogen and an alkyl radical containing from 1 to 5 carbon atoms, R'' and R''' are each selected from the group consisting of hydrogen, an alkyl radical and a monoalkenyl hydrocarbon radical, the total number of carbon atoms in R'' and R''' taken together not exceeding eight, with an alkyl halide wherein the alkyl radical contains from 1 to 5 carbon atoms in the presence of an alkylation catalyst selected from the group consisting of aluminum bromide, aluminum chloride and ferric bromide.

2. A method for the production of an organoboron compound useful as a fuel which comprises reacting with the formation of hydrogen halide a borane of the class $RR'B_{10}H_8(CR''CR''')$, wherein R and R' are each selected from the group consisting of hydrogen and an alkyl radical containing from 1 to 5 carbon atoms, R'' and R''' are each selected from the group consisting of hydrogen, an alkyl radical and a monalkenyl hydrocarbon radical, the total number of carbon atoms in R'' and R''' taken together not exceeding eight, with an alkyl halide wherein the alkyl radical contains from 1 to 5 carbon atoms, at a temperature within the range from $-10°$ to $+180°$ C. and at a pressure of from 0.2 to 20 atmospheres in the presence of an alkylation catalyst selected from the group consisting of aluminum bromide, aluminum chloride and ferric bromide, the molar ratio of the alkyl halide to the borane being within the range from 0.1:1 to 30:1 and the molar ratio of the alkylation catalyst to the borane being within the range from 0.01:1 to 2:1.

3. The method of claim 2 wherein the temperature is within the range from 0° to 50° C., the pressure is atmospheric, the molar ratio of the alkyl halide to the borane is within the range from 1.0:1 to 15:1, and the molar ratio of the alkylation catalyst to the borane is within the range from 0.1:1 to 0.2:1.

4. The method of claim 3 wherein the reactants are in admixture with an inert solvent selected from the group consisting of aliphatic hydrocarbons, aromatic hydrocarbons and cycloaliphatic hydrocarbons.

5. The method of claim 3 wherein the borane is $B_{10}H_{10}CHCH$.

6. The method of claim 3 wherein the alkylation catalyst is aluminum chloride.

7. The method of claim 3 wherein the alkyl halide is methyl bromide.

8. The method of claim 3 wherein the alkyl halide is ethyl bromide.

9. The method of claim 3 wherein the borane is $B_{10}H_{10}(CHCH)$, wherein the alkylation catalyst is aluminum chloride, and wherein the alkyl halide is methyl bromide.

10. The method of claim 4 wherein the borane is $B_{10}H_{10}(CHCH)$, wherein the alkylation catalyst is aluminum chloride, wherein the alkyl halide is ethyl bromide, and wherein the solvent is cyclohexane.

11. $R_nB_{10}H_{10-n}(CR'CR'')$ wherein R is an alkyl radical containing 1 to 5 carbon atoms, $n$ is an integer from 3 to 7, R' is selected from the group consisting of hydrogen and an alkyl radical, R'' is selected from the group consisting of hydrogen, an alkyl radical, a monoalkenyl hydrocarbon radical, the total number of carbon atoms in R' and R'' taken together not exceeding eight.

12. $(CH_3)_3B_{10}H_7(CHCH)$
13. $(CH_3)_4B_{10}H_6(CHCH)$
14. $(CH_3)_5B_{10}H_5(CHCH)$
15. $(CH_3)_6B_{10}H_4(CHCH)$
16. $(CH_3)_7B_{10}H_3(CHCH)$
17. $(C_2H_5)_3B_{10}H_7(CHCH)$
18. $(C_2H_5)_4B_{10}H_6(CHCH)$
19. $(C_2H_5)_5B_{10}H_5(CHCH)$
20. $(C_2H_5)_6B_{10}H_4(CHCH)$

No references cited.